(12) United States Patent
Pan et al.

(10) Patent No.: US 9,275,771 B2
(45) Date of Patent: Mar. 1, 2016

(54) CONDUCTIVE POLYMER, SYNTHESIS METHOD THEREOF, AND ELECTROACTIVE ELECTRODE COVERED WITH SAID CONDUCTIVE POLYMER

(75) Inventors: Lijia Pan, Nanjing (CN); Dongyuan Zhai, Nanjing (CN); Yi Shi, Nanjing (CN); Hao Qiu, Nanjing (CN)

(73) Assignee: Nanjing University, Nanjing (CN)

( * ) Notice: Subject to any disclaimer, the term of this patent is extended or adjusted under 35 U.S.C. 154(b) by 124 days.

(21) Appl. No.: 13/819,609
(22) PCT Filed: Mar. 31, 2011
(86) PCT No.: PCT/CN2011/072338
§ 371 (c)(1),
(2), (4) Date: Feb. 27, 2013
(87) PCT Pub. No.: WO2012/129805
PCT Pub. Date: Oct. 4, 2012

(65) Prior Publication Data
US 2013/0171338 A1 Jul. 4, 2013

(51) Int. Cl.
H01B 1/00 (2006.01)
B05D 5/12 (2006.01)
H01B 1/12 (2006.01)
H01M 4/60 (2006.01)
C08G 61/12 (2006.01)
C08G 73/02 (2006.01)
H01G 11/48 (2013.01)
C08K 5/09 (2006.01)
C08K 5/521 (2006.01)
H01M 4/1399 (2010.01)
C08J 9/28 (2006.01)

(52) U.S. Cl.
CPC ............... *H01B 1/12* (2013.01); *C08G 61/124* (2013.01); *C08G 61/126* (2013.01); *C08G 73/0266* (2013.01); *C08J 9/283* (2013.01); *C08K 5/09* (2013.01); *C08K 5/521* (2013.01); *H01G 11/48* (2013.01); *H01M 4/1399* (2013.01); *H01M 4/606* (2013.01); *H01M 4/608* (2013.01); *C08J 2201/0504* (2013.01); *C08J 2205/022* (2013.01); *C08J 2205/042* (2013.01); *C08J 2207/00* (2013.01); *C08J 2365/00* (2013.01); *Y02E 60/122* (2013.01); *Y02E 60/13* (2013.01); *Y02P 70/54* (2015.11)

(58) Field of Classification Search
None
See application file for complete search history.

(56) References Cited

U.S. PATENT DOCUMENTS 6,103,145 A * 8/2000 Angelopoulos et al. ...... 252/500

* cited by examiner

*Primary Examiner* — Mark Kopec
*Assistant Examiner* — Jaison Thomas
(74) *Attorney, Agent, or Firm* — Treasure IP Group, LLC

(57) ABSTRACT

The present invention provides a conducting polymer, a synthesis method thereof, and an electroactive electrode covered with the said conducting polymer. The conducting polymer is synthesized as follows: use the polybasic acid as dopant and crosslinking agent, and polymerize monomers into conducting polymer hydrogel. The monomers are selected one or more from pyrrole or its derivatives, thiophene or its derivatives, aniline or its derivatives. The acid group of the polybasic acid contains phosphate or polybasic acid which contains at least two substituents per molecule selected from sulfate, nitrate or carboxylic in which the molecular weight of at least one acid group is no more than 800. The mole ratio of the acid group in polybasic acid to monomers of the conducting polymer is 1:12-12:1. The preparation applied in the invention is simple, and need not to import any impurity. The conducting polymer hydrogel has high ionic conductivity, super hydrophilicity, and good biocompatibility.

11 Claims, 7 Drawing Sheets

● MULTI-FUNCTIONAL DOPING ACID
— POLYANILINE MAIN CHAIN

CONDUCTIVE POLYMER, SYNTHESIS METHOD THEREOF, AND ELECTROACTIVE ELECTRODE COVERED WITH SAID CONDUCTIVE POLYMER

CROSS REFERENCE TO RELATED PATENT APPLICATION

The present application is the US national stage of PCT/CN2011/072338 filed on Mar. 31, 2011, claims the priority of the PCT/CN2011/072338 filed on Mar. 31, 2011, which application is incorporated herein by reference.

FIELD OF THE INVENTION

The present invention relates to the field of conducting polymer hydrogels. More specifically, a synthetic method in which one material can be used both as the hydrogel matrix and the conducting polymer, and a novel conducting polymer hydrogel produced therefrom, as well as electroactive electrodes prepared using the said hydrogel. Moreover, a monolithic nanoporous conducting polymer can be produced by simply dehydrating the hydrogel. The synthetic method and the conducting polymer hydrogel of the present invention relates to the application of conducting polymer hydrogel or nanostructured polymer-based devices, such as biosensors, chemical sensors, transistors, memory, supercapacitors, lithium battery, biobattery, microbial fuel cell, microbial electrolysis cell, biofuel cells, artificial muscles, artificial organ, drug release, electronic-magnetic shielding, anticorrosion coating and electro-chromic devices, etc.

BACKGROUND OF INVENTION

Ever since MacDiarmid, Hideki Shirakawa, and Heeger invented conducting polymers and made it possible to dope these polymers over the full range from insulator to metal, a new field of research bordering chemistry and condensed-matter physics emerged, which created a number of opportunities in the application in photoelectronic, electronic and electrochemistry. Conducting polymers have the advantages of stable physical and chemical properties and high conductivity. More significantly, conducting polymers provide an excellent interface between the electronic-transporting phase (electrode) and the ionic-transporting phase (electrolyte). In addition, the conductivity of conducting polymers is dependent on variables such as redox state and pH, which makes conducting polymers ideal for smart materials such as sensors.

In recent decades, conducting polymer hydrogels have received increasing attention for its promising applications in biosensors, chemical sensors, bioelectrodes, biobattery, microbial fuel cell, microbial electrolysis cell, medical electrodes, artificial muscle, artificial organ, drug release, and biofuel cells, etc. due to the following reasons:

1) Conducting polymer hydrogels have nanostructured framework and sufficiently large interfacial area, which enhanced the diffusion of ions and molecules, as well as the transport of electrons;

2) Conducting polymer hydrogels have a softer mechanical interface comparing to conventional metal electrodes;

3) Conducting polymer hydrogel have a biocompatible environment closely matching those of biological tissues.

To date, only a few limited methods were developed to synthesize conducting polymer hydrogels due to the difficulty in achieving the two prerequisite conditions for conducting polymers to form hydrogels: 1) hydrophilicity of polymer; 2) chemical or physical crosslinking between polymer chains. Synthesis of conducting polymer hydrogels has been carried out by following methods:

1) Synthesizing conducting polymer in the matrix of non-conducting polymer hydrogels (i.e. forming a composite material consisting of non-conductive hydrogel and conducting polymer);

2) Using multivalent metal ions such as $Fe^{3+}$ or $Mg^{2+}$ to crosslink water soluble conducting polymer such as poly(3, 4-ethylenedioxythiophene) (PEDOT) by ions interacting with the negatively-charged electrolytic dopant;

3) Crosslinking polyaniline (PAni) by chemical reaction between epoxy group of the non-conducting crosslink agent and the amino group on PAni.

However, all of the above methods introduce impurities or nonfunctional materials, such as metal ions or nonfunctional polymers, thereby deteriorate the conductivity, electroactivity or biocompatibility of conducting polymers. In method 1), biocompatible composite material can be formulated using conducting polymer held in the matrix of hydrogels such as poly (vinyl alcohol), poly (ethylene glycol), and polyacrylamide chitosan, poly(2-hydroxyethyl methacrylate), poly (acrylic acid), poly (acrylamide), alginate hydrogel, etc. In this case, however, the non-functional polymer hydrogel impurity undoubtedly results in the lowering of conductivity and electroactivity of the material, which reduces the performance of electrodes and sensors. In method 2), crosslinked conducting polymer hydrogel is induced by ionic interaction of metal ions with negative polyelectrolyte dopant, which reduces the biocompatibility and enzyme activity of the hydrogels as high quantities of metal ions are required to form gels. In method 3), crosslinked PAni is made by the reaction between the epoxy crosslinking group and amino group on PAni main chain, which greatly reduces the conductivity of conducting polymers. In summary, the existing synthetic methods cannot meet the requirements of vast applications of conducting polymers, such as biomedical devices, biobattery, and microbial fuel cell.

SUMMARY OF THE INVENTION

The present invention provides a method for synthesizing a conducting polymer. The fabrication process is facile and does not introduce impurities.

The present invention also provides a method for synthesizing conducting polymer hydrogels.

The present invention further provides a method for synthesizing porous nanostructured conducting polymer.

The present invention further provides a method for fabricating electroactive electrode made from said conducting polymer hydrogel or nanostructured conducting polymer.

In certain embodiments of the present invention, conducting polymer hydrogels and monolithic nanostructures are produced in polymerization bath, suitable for bulk production. On the other hand, conducting polymer hydrogels and monolithic nanostructured conducting polymer can be produced in thin films by dip coating and spin coating with the precursors. The hydrogels can be easily micropatterned by ink jet printing.

The synthetic method of the present invention comprises using a polybasic acid as both the dopant and the crosslinking agent, and monomers are polymerized to form conducting polymer hydrogel. Said monomers can be aniline or its derivatives, pyrrole or its derivatives, or thiophene or its derivatives. Said polybasic acid either contains phosphoric acid functional group or contains at least two acid functional groups per molecule selecting from sulfonic acid group, nitric acid group, and carboxylic acid group, with a molecular weight of less than or equal to 800 g/mol.

In the preferred embodiments of the present invention, the molar ratio of the acid functional groups contained in the polybasic acid and the monomers of the conducting polymer is between 1:20 and 12:1.

The polybasic acid can be phytic acid, phosphoric acid, polyethylene phosphoric acid, N-butylsulfonate-3-methylimidazolium hydrogen sulfate, N-butylsulfonate pyridinium hydrogen sulfate and 1,2,4,5-benzenetetracarboxylic acid. In the best mode, the polybasic acid is phytic acid.

Moreover, electroactive electrode can be made from the conducting polymer hydrogel or the monolithic nanostructures. The as-synthesized hydrogel has a 3D-porous monolithic nanostructure constructed by branched nanofibers, where the BET surface area of dried hydrogel is larger than 30 $m^2 \cdot g^{-1}$. We discovered that the as-prepared conducting polymer hydrogels have high ionic conductivity of about 0.026 $S \cdot cm^{-1}$. Further, the conducting polymer hydrogels are superhydrophilic with a contact angle of lower than 15°. Also, the conducting polymer hydrogels have good bio-compatibility.

In the preferred embodiments, conducting polymer hydrogels can be uniformly produced with a monolithic coral-like nanostructure backbone. Conducting polymers can be doped by a polybasic acid, so that the conducting polymer is crosslinked and forms a monolithic coral-like nanostructure. The polybasic acid also changes the surface property of the conducting polymer to be super-hydrophilic, which facilitates gelation. It should be noted that the as-prepared hydrogels is consisted of the pure conducting polymer, doping acid and water instead of a composite; hence, high electroactivity of conducting polymers is maintained. In the whole synthesis, no metal ions are used, which makes the hydrogel biocompatible and suitable for the applications in the field of biosensors, biofuel cells, biobattery, microbial fuel cell, microbial electrolysis cell, artificial muscles, artificial organ, drug release, etc.

In summary, the present invention provides a template-free process using an aqueous polymerization bath, a practical bulk synthetic method capable of producing bulk quantities of pure and uniform conducting polymer hydrogels. The synthesis method is based on chemical oxidative polymerization of the monomers. The synthetic method also yields a monolithic nanostructure with nearly uniform reproducible diameters. Meanwhile, the synthesis process has flexible processability in that the hydrogel thin film can be formed by means of dip coating and spin coating. The hydrogels can be easily micropatterned by ink jet printing. These and other advantages will become more apparent from the following detailed description of the preferred embodiment.

DETAILED DESCRIPTION OF THE INVENTION

Figure 1A:
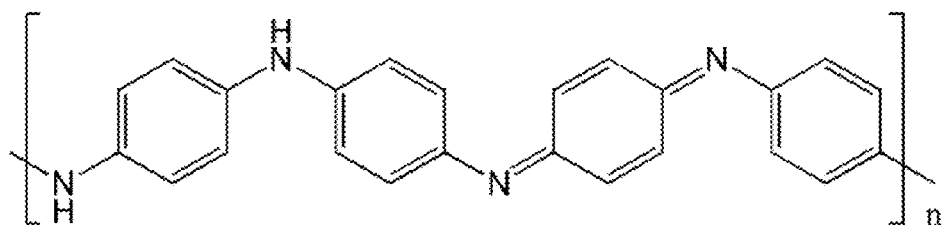
FIG. 1A is a molecular structure diagram of emeraldine base polyaniline (PAni).
Figure 1B:
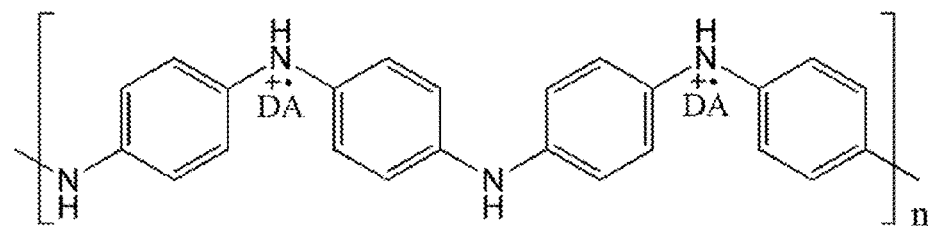
FIG. 1B is a molecular structure diagram of doped PAni emeraldine salt, where DA refers to doping acid.
Figure 1C:
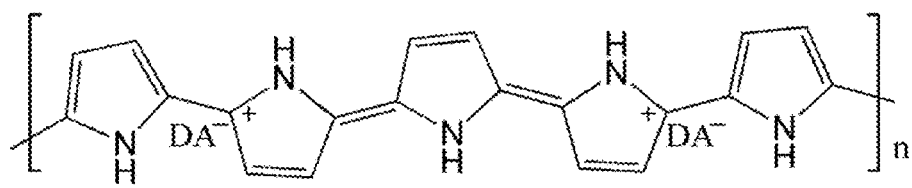
FIG. 1C is a molecular structure diagram of polypyrrole doped with doping acid (DA).
Figure 1D:
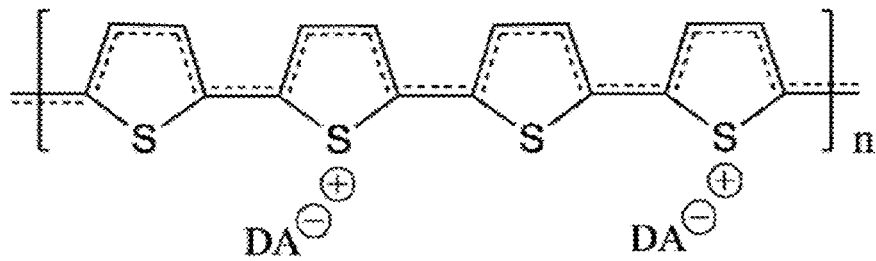
FIG. 1D is a diagram of the chemical structure of poly(3,4-ethylenedioxythiophene) (PEDOT) doped with doping acid (DA).
Figure 2:
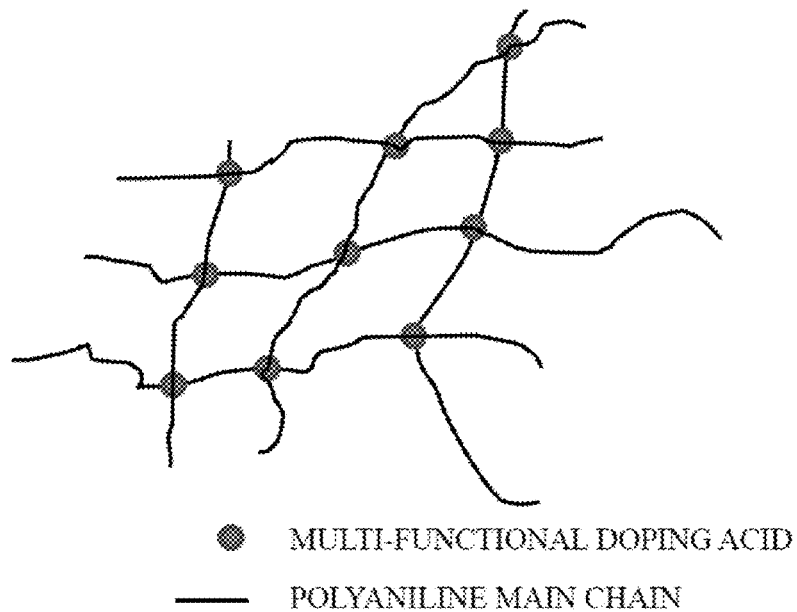
FIG. 2 is a schematic of the mechanism of the formation of conducting polymer hydrogel. The doping acid provides multi-doping sites, thus crosslinking the conducting polymer chains and form hydrogels.
Figure 3:
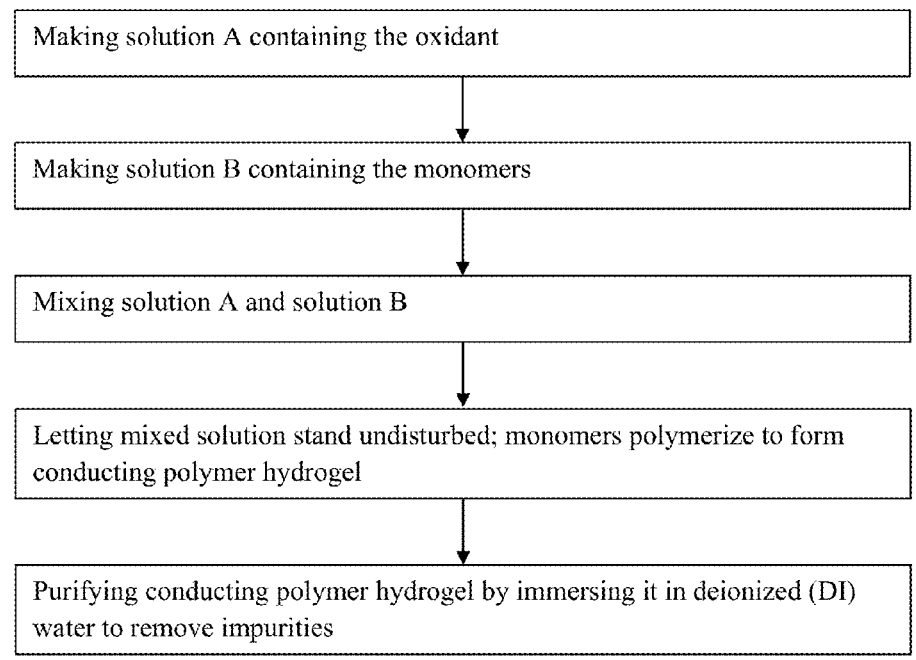
FIG. 3 is a process flow of the method for synthesizing conducting polymer hydrogel.

The present invention provides a method for synthesizing conducting polymer by chemical oxidative polymerization. Monomers such as aniline monomers can be linked together to form polyaniline (PAni). The PAni can be doped with an acid (doping acid, DA), such as phosphoric acid or phytic acid. When the conducting polymer is doped by a polybasic acid, the conducting polymer is crosslinked and forms a hydrogel with monolithic coral-like nanostructure (FIG. 2). In the present invention, a five-step method (FIG. 3) of synthesizing PAni hydrogel relies on a facile chemical process to bulk produce high quality PAni hydrogel under ambient conditions using a polybasic acid (with more than 3 protons to donate) in polymerization.

In step 1, a solution is first prepared by mixing water with an oxidant. The oxidant is preferably ammonium persulfate $(NH_4)_2S_2O_8$, but other oxidants may be used, such as iron (III) chloride, copper (II) chloride, silver nitrate, hydrogen peroxide, chloroauric acid and ammonium cerium(IV) nitrate and other persulfate derivatives such as $Na_2S_2O_8$ and $K_2S_2O_8$.

In step 2, a monomer solution is prepared by dissolving the monomers and the acid in water or an organic solvent. In one embodiment of the invention, the monomer is aniline, but other carbon-based organic monomers can be used, such as pyrrole, thiophene, toluidine, anisidine and other derivatives of aniline such as methylaniline, ethyl aniline, 2-alkoxyaniline, and 2,5-dialkoxyaniline monomers, for forming PAni, polypyrrole, poly thiophene, poly toluidine, polyanisidine, polymethylaniline, polyethylaniline, poly (2-alkoxyaniline) and poly (2,5-dialkoxyaniline), etc. The acid is preferably phytic acid, but other polybasic acids (with more than 3 protons to donate) can be used, such as 1,2,4,5-benzenetetracarboxylic acid, phosphoric acid, polystyrenesulfonate, poly (vinylphosphinc acid), adenosine tri-phosphate, polycrylic acid, etc. The reaction can be carried in either mono-phase aqueous solution or water-organic solvent dual-phase solution (interphase polymerization). In interphase polymerization, the organic solvent is preferably carbon tetrachloride ($CCl_4$), but other organic solvents may be used, such as benzene, toluene, chloroform, methylene chloride, xylene, hexane, diethylether, dichloromethane and carbon disulfide. In the preferred embodiments, aniline monomer and phytic acid are soluble in water.

In step 3, the monomer solution is placed in a reaction vessel. The size of the reaction vessel be scaled from small to large for increased batch production of bulk polymer hydrogels. The vessel can also be in varied shapes to cast the hydrogel according to the shape of the vessel. Then, the solution containing the oxidant is mixed into the reaction vessel with the monomer solution.

In step 4, the mixed solution is left undisturbed for a few minutes up to a few days, and polymerization reaction occurs in the mixed solution to form PAni hydrogel. This is indicated by the color change of the solution into a dark green color due to the formation PAni.

In step 5, the hydrogel is purified by conventional processes such as dialysis or simply ionic change in deionized (DI) water or distilled water, yielding a pure hydrogel product: phytic acid doped PAni. In this step, the hydrogel can be dedoped by washing or dialyzing with a base, such as aqueous ammonia, without destroying the hydrogel structure because the porous backbone of PAni can retain the shape. To test if gelation has occurred (whether a hydrogel is formed), an inversion test may be used: turn the vessel upside down to examine if the water-containing solution is immobilized. In the present inversion, gelation is indicated by no observable fluidity within 30 minutes after the vessel is inverted.

The present invention provides methods for synthesizing conducting polymer hydrogel by both homogeneous reaction and interface reaction. The present invention also provides a method for fabricating glucose oxidase electrode using previously prepared conducting polymer hydrogel. The present invention is described in detail by reference to the following examples, which are offered by way of illustration and are not intended to limit the invention in any manner.

I. Homogeneous Reaction

1. Phytic Acid (Containing 6 Phosphoric Acid Groups) Doped PAni Hydrogel

Figure 4A:
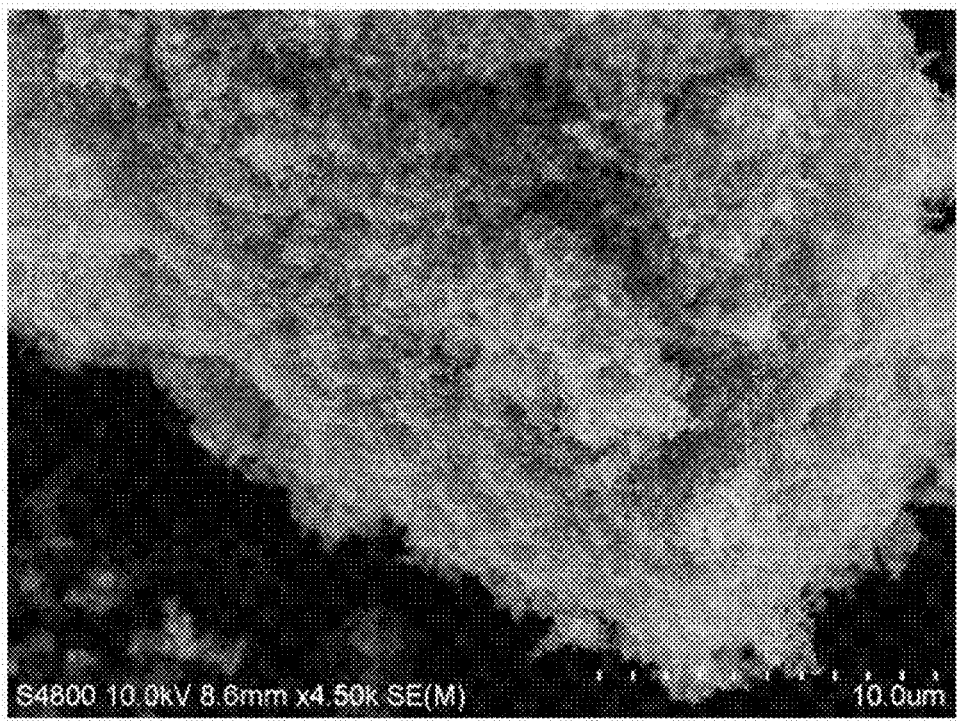
FIG. 4A is a scanning electron microscope (SEM) image of lyophilized PAni hydrogel.
Figure 4B:
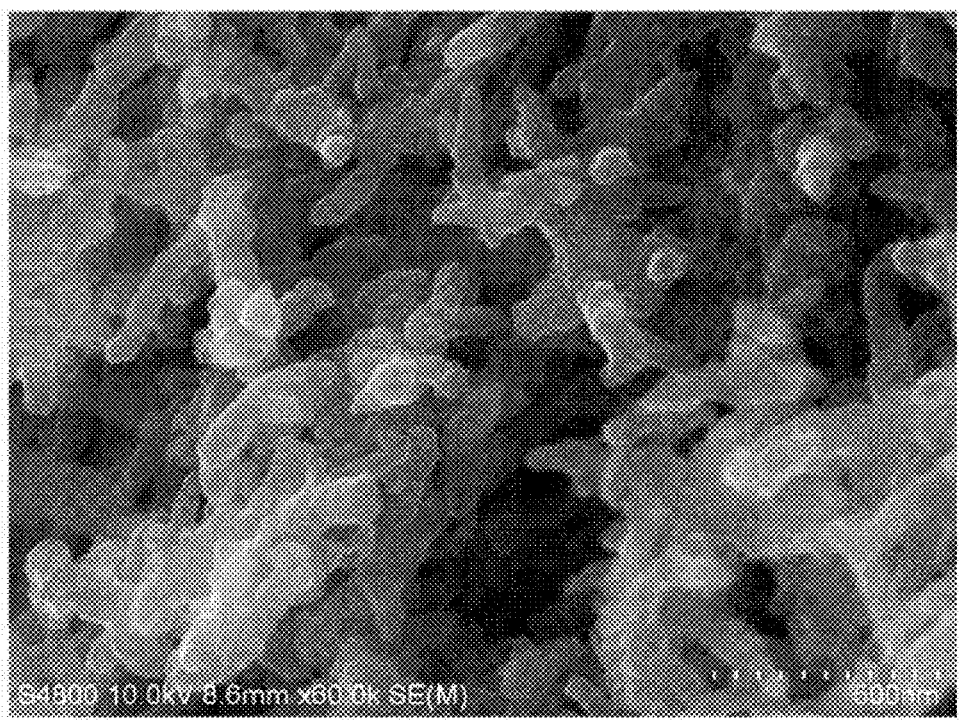
FIG. 4B is an SEM image of lyophilized PAni hydrogel with higher magnification.
Figure 5:
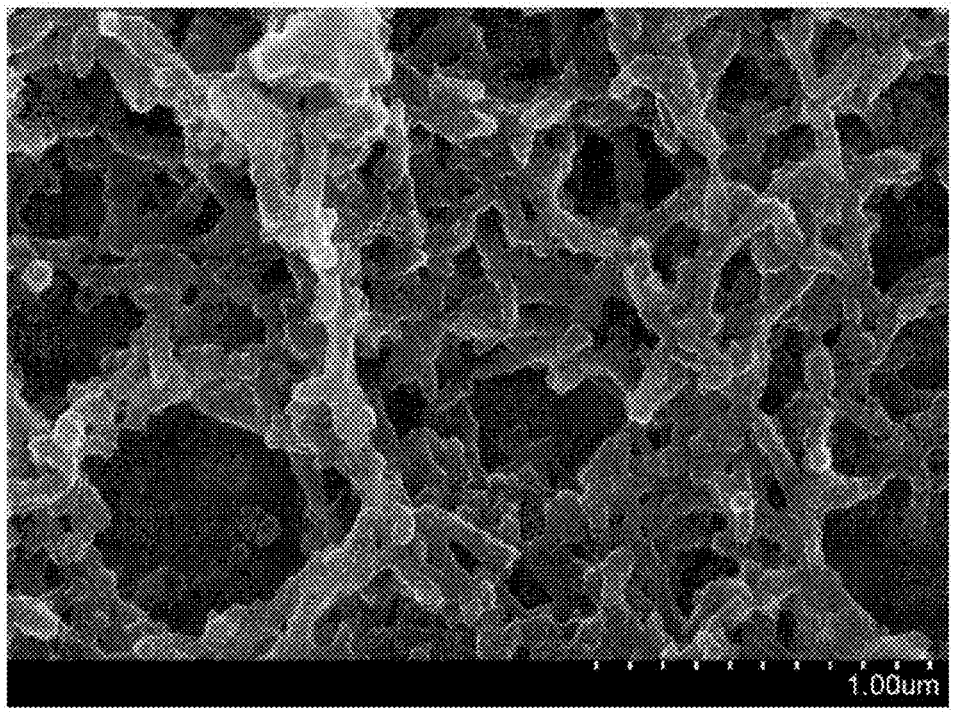
FIG. 5 is an SEM image of lyophilized polypyrrole hydrogel.
Figure 6:
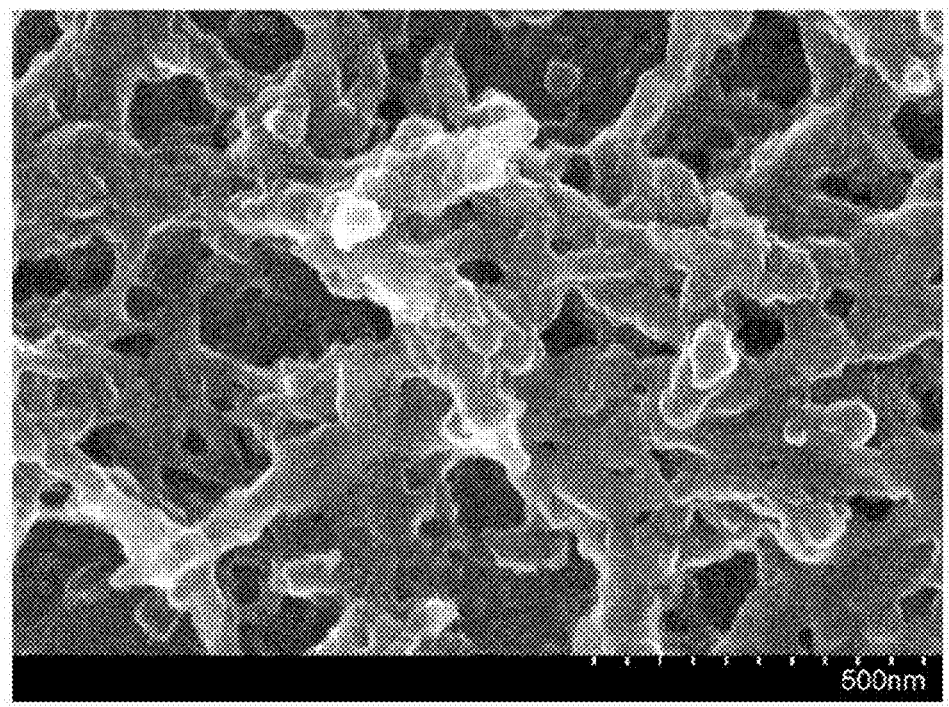
FIG. 6 is an SEM image of lyophilized polythiophene hydrogel.
Figure 7:
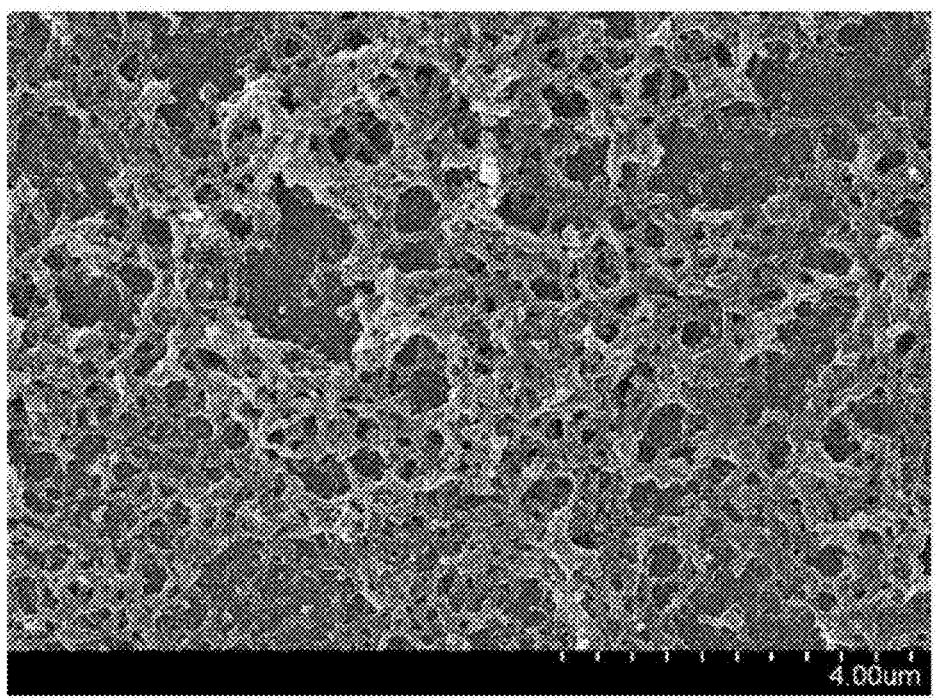
FIG. 7 is an SEM image of PAni hydrogel thin film formed by spin coating.
Figure 8A:
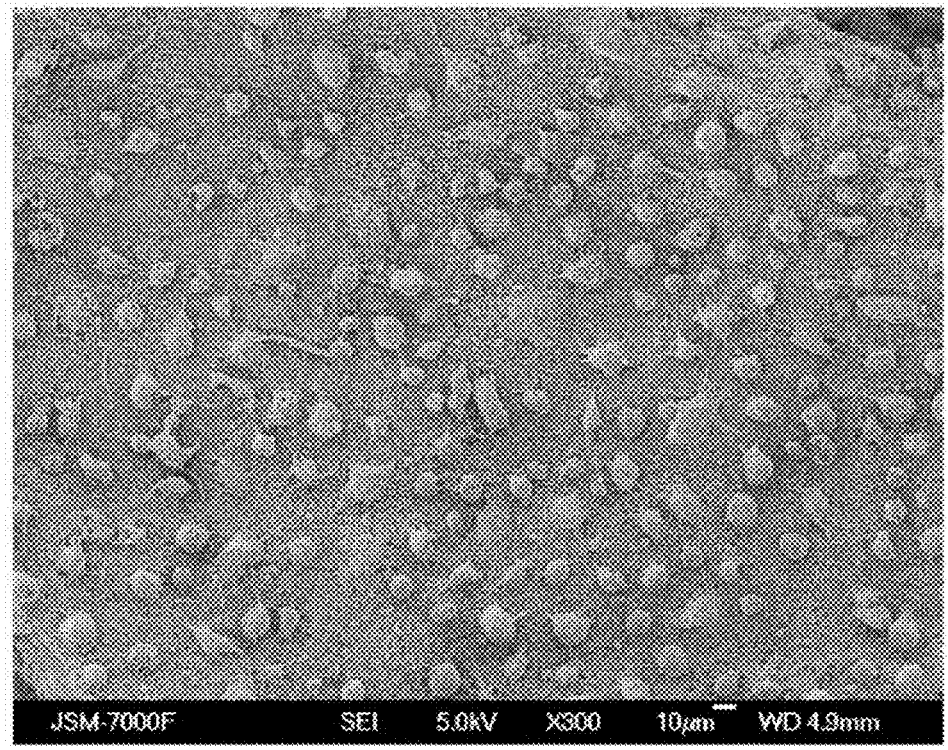
FIG. 8A is an SEM image of bovine bone marrow stem cells grown on phytic acid doped PAni hydrogel.
Figure 8B:
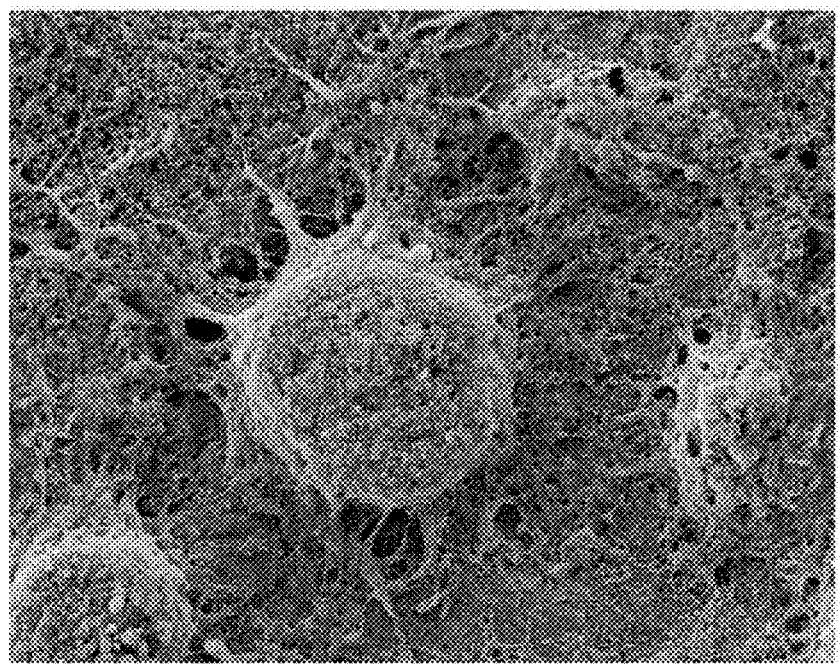
FIG. 8B is an SEM image of bovine bone marrow stem cells grown on phytic acid doped PAni hydrogel with higher magnification.
Figure 9:
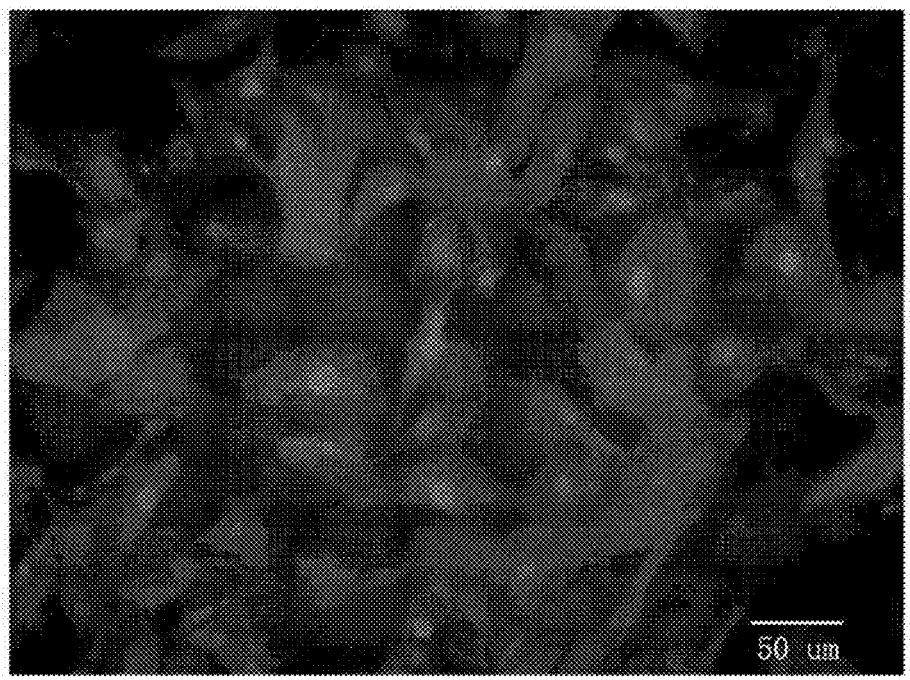
FIG. 9 is a fluorescence microscope image of bovine bone marrow stem cells grown on polyethylene phosphoric acid doped polypyrrole hydrogel.
Figure 10:
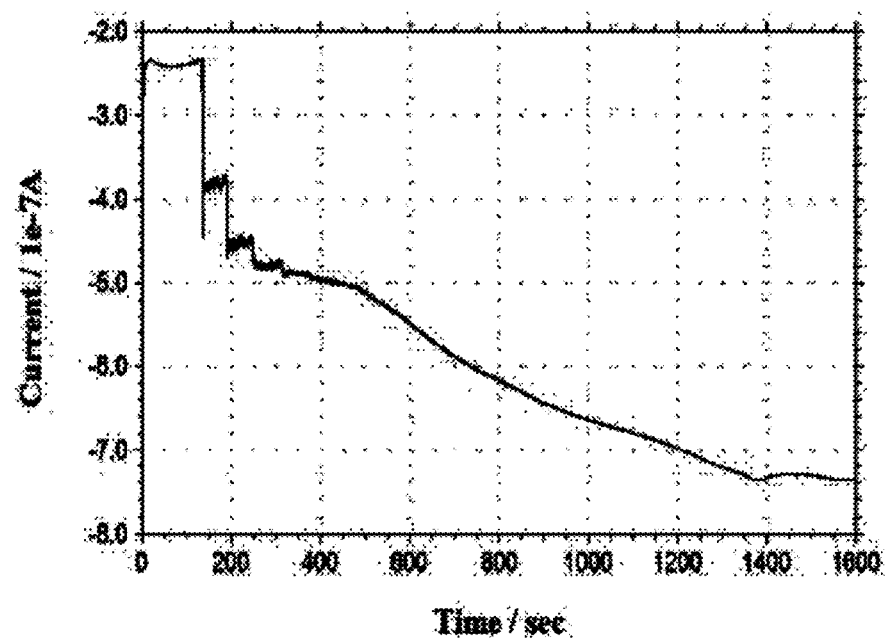
FIG. 10 is amperometric response of the glucose oxidase electrode to glucose, for which the oxidase electrode is fabricated using phytic acid doped PAni hydrogel.

First, 20 mL of ammonium persulfate solution of concentration 2 M (solution A) was prepared by dissolving ammonium persulfate $(NH_4)_2S_2O_8$ in water. Then, 25 mL of the monomer solution was prepared by mixing phytic acid, aniline and water (solution B). The total molar ratio of ammonium persulfate:aniline:phytic acid was 3:6:1. Solution A and B were mixed in the reaction vessel. Within a few minutes, polymerization reaction occurred in the reaction vessel, forming PAni hydrogel. The color of the mixed solution turned into dark green and the solution lost fluidity. Finally, the hydrogel was purified by immersing in DI water for several days, yielding a hydrogel product with 72% water content. In this reaction, the molar ratio of reagents can be varied within a certain range. For instance, the ratio of aniline to the number of phosphoric acid groups in phytic acid can be between 1:12~12:1; the molar ratio between ammonium persulfate and aniline can be varied within a wide range; of the resulting hydrogel has a water content between 35% to 82%. The contact angle of the PAni hydrogel is less than 15°, thus is superhydrophilic. The hydrogel has an ionic conductivity of 0.025 $S \cdot cm^{-1}$ based on electrochemical impedance spectroscopy. Lyophilized hydrogel was shown under SEM to have monolithic porous structure constructed with coral-like dendritic nanofibers (FIGS. 4A and 4B). The Brunauer-Emmett-Teller (BET) specific surface area of the dehydrated hydrogel was measured to be larger than 30 $m^2 \cdot g^{-1}$. Spin coating the precursor solution at 2000 RPM results in consistent, green, transparent conducting PAni hydrogel thin film.

2. Phytic Acid Doped PAni Hydrogel (34% Water Content)

First, 0.286 g of ammonium persulfate was mixed with water to form ammonium persulfate 1 mL solution (solution A). Second, the monomer solution (solution B) was prepared by mixing aniline (0.458 mL) and phytic acid (0.921 mL). The concentration of solution B may be derived from the water content of the hydrogel. Then, solution A and solution B were mixed, and polymerization occurred within minutes, forming PAni hydrogel. The color of the mixed solution turned into dark green, and the solution lost fluidity. The resulting hydrogel product had 34% water content and the ionic conductivity was 0.030 $S \cdot cm^{-1}$.

3. Phytic Acid Doped PAni Hydrogel (85% Water Content)

First, 0.286 g of ammonium persulfate was mixed with water to form 2.5 mL ammonium persulfate solution (solution A). Second, 6.5 mL of the monomer solution (solution B) was prepared by mixing aniline (0.458 mL) and phytic acid (0.921 mL) and water. Then, solution A and solution B were mixed, and polymerization occurred within minutes, forming PAni hydrogel. The color of the mixed solution turned into dark green, and the solution lost fluidity. The resulting hydrogel product had 85% water content and the ionic conductivity was 0.017 $S \cdot cm^{-1}$.

4. Phytic Acid Doped PAni Hydrogel (Molar Ratio of Phosphoric Acid Group:Aniline Monomer=1:12)

First, 20 mL of 2 M ammonium persulfate solution was prepared (solution A). Second, 25 mL of the monomer solution (solution B) was prepared so that the molar ratio of ammonium persulfate:aniline:phytic acid=18:72:1. Then, solution A and solution B were mixed. Polymerization slowly occurred 24 hours after the two solutions were mixed together. This reaction was slower because the amount of crosslinking agent, phosphoric acid, was much lower, close to the boundary condition for forming hydrogels. PAni hydrogel slowly formed and the color of the mixed solution turned into dark yellow, an indication that the degree of doping was low. Compared to the dark green color of PAni hydrogel, the PAni hydrogel product in this example was not sufficiently doped. The solution lost fluidity, indicating gelation.

5. Phytic Acid Doped PAni Hydrogel (Molar Ratio of Phosphoric Acid Group:Aniline Monomer=12:1)

First, 20 mL of 2 M ammonium persulfate solution was prepared (solution A). Second, 25 mL of the monomer solution (solution B) was prepared so that the molar ratio of ammonium persulfate:aniline:phytic acid=1:2:4. Then, solution A and solution B were mixed. Since the amount of phytic acid exceeded the needed amount for doping PAni, excess phytic acid impeded the formation of hydrogel. Polymerization slowly occurred 12 hours after the two solutions were mixed together. The color of the mixed solution turned into dark green, and the solution lost fluidity.

6. 1,2,4,5-Benzenetetracarboxylic Acid (Containing 4 Carboxylic Acid Groups) Doped PAni Hydrogel First, 20 mL of ammonium persulfate solution of concentration 2 M (solution A) was prepared. Then, 25 mL of the monomer solution was prepared by mixing 1,2,4,5-benzenetetracarboxylic acid, aniline and water (solution B). The total molar ratio of ammonium persulfate:aniline:1,2,4,5-benzenetetracarboxylic acid was 2:4:1. Solution A and B were mixed in the reaction vessel. Within a few minutes, polymerization reaction occurred in the reaction vessel, forming PAni hydrogel. The color of the mixed solution turned into dark green and the solution lost fluidity. Finally, the hydrogel was purified by immersing in DI water, yielding a hydrogel product. Lyophilized hydrogel powder was compressed into disks, with ionic conductivity of 0.0026 $S \cdot cm^{-1}$ based on standard four-probe measurements. Carboxylic acid is a weak acid, therefore carboxylic acid doped PAni has low ionic conductivity.

7. Phosphoric Acid (Containing 3 Protons to Donate) Doped PAni Hydrogel

First, 20 mL of 2 M ammonium persulfate solution (solution A) was prepared. Then, 25 mL of the monomer solution was prepared by mixing phosphoric acid, aniline and water (solution B). The total molar ratio of ammonium persulfate:aniline:phosphoric acid was 1:2:2. Solution A and B were mixed in the reaction vessel. Within a few minutes, polymerization reaction occurred in the reaction vessel, forming PAni hydrogel. The color of the mixed solution turned into dark green and the solution lost fluidity. Finally, the hydrogel was purified by immersing in DI water, yielding a hydrogel product. Lyophilized hydrogel powder was compressed into disks, with ionic conductivity of 0.031 $S \cdot cm^{-1}$ based on standard four-probe measurements.

8. N-Butylsulfonate Pyridinium Hydrogen Sulfate (Containing 1 Sulfamic Acid Group and 1 Sulfuric Acid Group) Doped PAni Hydrogel First, 20 mL of 2 M ammonium persulfate solution (solution A) was prepared. Then, 25 mL of the monomer solution was prepared by mixing N-butylsulfonate pyridinium hydrogen sulfate, aniline and water (solution B). The total molar ratio of ammonium persulfate:aniline:N-butylsulfonate pyridinium hydrogen sulfate was 1:2:1. Solution A and B were mixed in the reaction vessel. Within a few minutes, polymerization reaction occurred in the reaction vessel, forming PAni hydrogel. The color of the mixed solution turned into dark green and the solution lost fluidity. Finally, the hydrogel was purified by immersing in DI water, yielding a hydrogel product. Lyophilized hydrogel powder was compressed into disks, with ionic conductivity of 0.13 $S \cdot cm^{-1}$ based on standard four-probe measurements.

9. Polyethylene Phosphoric Acid Doped PAni Hydrogel

First, 20 mL of 2 M ammonium persulfate solution (solution A) was prepared. Then, 25 mL of the monomer solution was prepared by mixing polyethylene phosphoric acid, aniline and water (solution B). The total molar ratio of ammonium persulfate:aniline:polyethylene phosphoric acid groups in polyethylene phosphoric acid was 1:2:2. Solution A and B were mixed in the reaction vessel. Within a few minutes, polymerization reaction occurred in the reaction vessel, forming PAni hydrogel. The color of the mixed solution turned into dark green and the solution lost fluidity. Finally, the hydrogel was purified by immersing in DI water, yielding a hydrogel product. Lyophilized hydrogel powder was compressed into disks, with ionic conductivity of 0.018 $S \cdot cm^{-1}$ based on standard four-probe measurements.

10. Phytic Acid (Containing 6 Phosphoric Acid Groups) Doped Polypyrrole Hydrogel First, 20 mL of 2 M ammonium persulfate solution (solution A) was prepared. Then, 25 mL of the monomer solution was prepared by mixing pyrrole, ethylene glycol and phytic acid (solution B). The purpose of adding ethylene glycol was to increase the solubility of pyrrole. The volume ratio of ethylene glycol to water was 1:10. The total molar ratio of ammonium persulfate:pyrrole:phytic acid was 3:6:1. Solution A and B were mixed in the reaction vessel. Polymerization reaction occurred rapidly in the reaction vessel, forming polypyrrole hydrogel. The color of the mixed solution turned into black and the solution lost fluidity. Finally, the hydrogel was purified by immersing in DI water, yielding a hydrogel product. Lyophilized hydrogel powder was compressed into disks, with ionic conductivity of 4.3 $S \cdot cm^{-1}$ based on standard four-probe measurements.

11. Phytic Acid Doped Poly(2-2-Hydroxyethyl Thiophene)

First, 20 mL of 2 M ammonium persulfate solution (solution A) was prepared. Then, monomer solution was prepared by mixing 2-2-hydroxyethyl thiophene and phytic acid (solution B). The total molar ratio of ammonium persulfate:2-2-hydroxyethyl thiophene:phytic acid was 3:6:1. Solution A and B were mixed in the reaction vessel. Within a few minutes, polymerization reaction occurred in the reaction vessel, forming poly(2-2-hydroxyethyl thiophene) hydrogel. The color of the mixed solution turned into dark blue and the solution lost fluidity. Finally, the hydrogel was purified by immersing in DI water, yielding a hydrogel product. Lyophilized hydrogel powder was compressed into disks, with ionic conductivity of 5.6 $S \cdot cm^{-1}$ based on standard four-probe measurements.

12. Phosphoric Acid Doped Poly(2-2-Hydroxyethyl Thiophene)

First, 20 mL of 2 M ammonium persulfate solution (solution A) was prepared. Then, monomer solution was prepared by mixing 2-2-hydroxyethyl thiophene and phosphoric acid (solution B). The total molar ratio of ammonium persulfate:2-2-hydroxyethyl thiophene:phosphoric acid was 1:2:2. Solution A and B were mixed in the reaction vessel. Within a few minutes, polymerization reaction occurred in the reaction vessel, forming poly(2-2-hydroxyethyl thiophene) hydrogel. The color of the mixed solution turned into dark blue and the solution lost fluidity. Finally, the hydrogel was purified by immersing in DI water, yielding a hydrogel product. Lyophilized hydrogel powder was compressed into disks, with ionic conductivity of 6.2 $S \cdot cm^{-1}$ based on standard four-probe measurements.

II. Interface Polymerization

1. Phytic Acid Doped PAni Hydrogel by Interface Polymerization

First, 20 mL of 2 M ammonium persulfate aqueous solution (solution A) was prepared. Phytic acid was mixed in solution A. Then, 25 mL of the monomer solution was prepared by mixing aniline and carbon tetrachloride (solution B). The total molar ratio of ammonium persulfate:aniline:phytic acid was 3:6:1. Solution B was placed in the reaction vessel, and solution A was slowly poured into the vessel to form water-carbon tetrachloride two phase system. Polymerization reaction occurred at the interface between water and carbontetrachloride, forming PAni hydrogel in the aqueous phase. The color of the aqueous phase turned into dark green and the aqueous solution lost fluidity. The organic phase was discarded. Finally, the hydrogel was purified by immersing in DI water, yielding a hydrogel product. Lyophilized hydrogel powder was compressed into disks, with ionic conductivity of 0.018 $S \cdot cm^{-1}$ based on standard four-probe measurements.

2. Phytic Acid Doped Polypyrrole Hydrogel by Interface Polymerization

First, 20 mL of 2 M ammonium persulfate aqueous solution (solution A) was prepared. Phytic acid was mixed in solution A. Then, 25 mL of the monomer solution was prepared by mixing pyrrole and carbon tetrachloride (solution B). The total molar ratio of ammonium persulfate:pyrrole:phytic acid was 3:6:1. Solution B was placed in the reaction vessel, and solution A was slowly poured into the vessel to form water-carbon tetrachloride two phase system. Polymerization reaction occurred rapidly at the interface between water and carbontetrachloride, forming polypyrrole hydrogel in the aqueous phase. The color of the aqueous phase turned into black and the aqueous solution lost fluidity. The organic phase was discarded. Finally, the hydrogel was purified by immersing in DI water, yielding a hydrogel product. Lyophilized hydrogel powder was compressed into disks, with ionic conductivity of 1.8 S·cm$^{-1}$ based on standard four-probe measurements.

3. Phosphoric Acid Doped Polypyrrole Hydrogel by Interface Polymerization

First, 20 mL of 2 M ammonium persulfate aqueous solution (solution A) was prepared. Phosphoric acid was mixed in solution A. Then, 25 mL of the monomer solution was prepared by mixing pyrrole and carbon tetrachloride (solution B). The total molar ratio of ammonium persulfate:pyrrole:phosphoric acid was 1:2:2. Solution B was placed in the reaction vessel, and solution A was slowly poured into the vessel to form water-carbon tetrachloride two phase system. Polymerization reaction occurred rapidly at the interface between water and carbontetrachloride, forming polypyrrole hydrogel in the aqueous phase. The color of the aqueous phase turned into black and the aqueous solution lost fluidity. The organic phase was discarded. Finally, the hydrogel was purified by immersing in DI water, yielding a hydrogel product. Lyophilized hydrogel powder was compressed into disks, with ionic conductivity of 2.1 S·cm$^{-1}$ based on standard four-probe measurements.

4. Polyethylene Phosphoric Acid Doped Polypyrrole Hydrogel by Interface Polymerization First, 20 mL of 2 M ammonium persulfate aqueous solution (solution A) was prepared. Polyethylene phosphoric acid was mixed in solution A. Then, 25 mL of the monomer solution was prepared by mixing pyrrole and carbon tetrachloride (solution B). The total molar ratio of ammonium persulfate:pyrrole:phosphoric acid groups in polyethylene phosphoric acid was 1:2:2. Solution B was placed in the reaction vessel, and solution A was slowly poured into the vessel to form water-carbon tetrachloride two phase system. Polymerization reaction occurred rapidly at the interface between water and carbontetrachloride, forming polypyrrole hydrogel in the aqueous phase. The color of the aqueous phase turned into black and the aqueous solution lost fluidity. The organic phase was discarded. Finally, the hydrogel was purified by immersing in DI water, yielding a hydrogel product. Lyophilized hydrogel powder was compressed into disks, with ionic conductivity of 2.5 S·cm$^{-1}$ based on standard four-probe measurements. The resulting hydrogel was highly biocompatible.

In summary, the present invention is generally directed to a synthesis method for forming a pure conducting polymer hydrogels (not a composite) or monolithic nanostructures. The synthesis of conducting polymer hydrogel and nanostructures is readily scalable and can be carried out at room temperature, which is wholly green chemistry. Due to the advantage of its pure composition of conducting polymer, high ionic conductivity, super-hydrophilic, and high biocompatibility, the hydrogel materials of this invention can be widely used in development of conducting polymer hydrogel or nanostructure based devices, such as biosensors, chemical sensors, transistors, memory, supercapacitors, Lithium battery, fuel cell, biofuel cells, artificial muscles, artificial organ, drug release, electronic-magnetic shielding, anticorrosion coating and electro chromic devices . . . etc. The method relies on the use of apolybasic acid with multiple acid groups, thus the conducting polymer is crosslinked and forms into a monolithic coral-like nanostructure. The reaction can be carried out in either aqueous solution or water-organic two-phase solution. Various monomers, solvents, oxidizers, and acids can be used as alternatives, modifications, and improvements to the preferred forms. Those skilled in the art can make enhancements, improvements, and modifications to the invention, and these enhancements, improvements, and modifications may nonetheless fall within the spirit and scope of the following claims.

Another application of the present invention is to fabricate glucose oxidase electrode using the phytic acid doped PAni hydrogel. Precursor solution was prepared according to the description in I-1 (mixed A and B solutions). The precursor solution was dropped on the surface of a platinum electrode and allowed to polymerize. The electrode was subsequently immersed into DI water to remove excess ions and then dehydrated. Aqueous solution of glucose oxidase was dropped onto the PAni film. Using a platinum electrode as the counter electrode and a saturated calomel electrode as the reference electrode, a three-electrode cell was employed for the glucose sensing test. The hydrogel oxidase electrode was shown to be very sensitive to the amount of glucose added to the solution, with a response time of 6 sec. This is a significant improvement over oxidase electrodes fabricated using PAni prepared according to conventional methods, which usually have a response time of a few minutes.

What is claimed is:

1. A method of synthesizing porous nanostructured conducting polymer, which comprises:
polymerizing monomers to form conducting polymer hydrogel by using a polybasic acid as a dopant and a crosslinking agent;
purifying and dehydrating said conducting polymer hydrogel to produce porous nanostructured conducting polymer;
wherein said monomer being selected from a group consisting of
(a) pyrrole or its derivatives,
(b) thiophene or its derivatives,
(c) aniline or its derivatives, and
wherein said polybasic acid either
containing phosphoric acid functional group, or
containing at least two acid functional groups per molecule,
selected from a category consisting of
(a) sulfonic acid group,
(b) nitric acid group, and
(c) carboxylic acid group,
and
having a molecular weight of less than or equal to 800 g/mol.

2. The method according to claim 1, wherein the molar ratio of acid functional groups contained in the polybasic acid and the monomers of the conducting polymer is between 1:20 and 12:1.

3. The method according to claim 2, wherein the polybasic acid is selected from the group consisting of phytic acid, phosphoric acid, polyethylene phosphoric acid, N-butylsulfonate-3-methylimidazolium hydrogen sulfate, N-butylsulfonate pyridinium hydrogen sulfate and 1,2,4,5-benzenetetracarboxylic acid.

4. The method according to claim 1, wherein the polybasic acid is selected from a group consisting of phytic acid, phosphoric acid, polyethylene phosphoric acid, N-butylsulfonate-3-methylimidazolium hydrogen sulfate, N-butylsulfonate pyridinium hydrogen sulfate and 1,2,4,5-benzenetetracarboxylic acid.

5. The method according to claim 4, wherein the polybasic acid is phytic acid.

6. The method according to claim 1, wherein a water content of the conducting polymer hydrogel is between 30-85%.

7. The method according to claim 1, wherein monomers are oxidized by an oxidant to form conducting polymer hydrogel by means of chemical oxidative polymerization.

8. The method according to claim 7, wherein the oxidant is selected from a group consisting of persulfate, iron (III) chloride, copper (II) chloride, silver nitrate, hydrogen peroxide, chloroauric acid and ammonium cerium(IV) nitrate.

9. The method according to claim 7 further comprising:
(a) making solution (solution A) containing the oxidant;
(b) making solution (solution B) containing the monomers; and
(c) mixing solution A and solution B, so that monomers are polymerized to form conducting polymer hydrogel,
wherein solution A is aqueous solution, solution B is aqueous or organic solution, and the polybasic acid is added in solution A and/or solution B.

10. The method according to claim 1, wherein a molar ratio of the acid functional groups contained in the polybasic acid and the monomers of the conducting polymer is between 2:1 and 1:2.

11. The method according to claim 1, wherein a water content of the conducting polymer hydrogel is between 34-85%.

* * * * *